United States Patent
Kimpara et al.

(10) Patent No.: US 9,130,497 B2
(45) Date of Patent: Sep. 8, 2015

(54) CONTROL DEVICE FOR ALTERNATING CURRENT ROTATING MACHINE AND ELECTRIC POWER STEERING DEVICE EQUIPPED WITH CONTROL DEVICE FOR ALTERNATING CURRENT ROTATING MACHINE

(75) Inventors: Yoshihiko Kimpara, Chiyoda-ku (JP); Yasuaki Hori, Kobe (JP); Masashi Iwane, Minato-ku (JP); Tatsuya Mori, Chiyoda-ku (JP); Yuji Takatsuka, Kobe (JP); Mamoru Shiraki, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 14/234,202

(22) PCT Filed: Nov. 17, 2011

(86) PCT No.: PCT/JP2011/076520
§ 371 (c)(1),
(2), (4) Date: Jan. 22, 2014

(87) PCT Pub. No.: WO2013/073033
PCT Pub. Date: May 23, 2013

(65) Prior Publication Data
US 2014/0152206 A1 Jun. 5, 2014

(51) Int. Cl.
*H02P 21/00* (2006.01)
*H02P 6/18* (2006.01)
(Continued)

(52) U.S. Cl.
CPC ............ *H02P 21/0096* (2013.01); *B62D 5/046* (2013.01); *H02P 21/0035* (2013.01); *H02P 21/0085* (2013.01); *H02P 23/0086* (2013.01)

(58) Field of Classification Search
CPC ... H02P 21/146; H02P 2207/05; H02P 27/08; H02P 6/185; H02P 21/00; H02P 21/0035; H02P 21/06; H02P 21/085; H02P 21/145; H02P 2203/01; H02P 2203/11; H02P 3/025; H02P 6/18; H02P 6/183; H02P 25/00
USPC .................... 318/254.1, 432, 400.02, 400.07, 318/400.11, 400.34
See application file for complete search history.

(56) References Cited

U.S. PATENT DOCUMENTS

| | | | | |
|---|---|---|---|---|
| 4,967,135 A | * | 10/1990 | Ashikaga et al. | 318/808 |
| 5,032,771 A | * | 7/1991 | Kerkman et al. | 318/52 |
| 5,914,582 A | * | 6/1999 | Takamoto et al. | 318/801 |

(Continued)

FOREIGN PATENT DOCUMENTS

| | | |
|---|---|---|
| JP | 2-111281 A | 4/1990 |
| JP | 2006-254572 A | 9/2006 |

(Continued)

*Primary Examiner* — Paul Ip
(74) *Attorney, Agent, or Firm* — Sughrue Mion, PLLC; Richard C. Turner

(57) ABSTRACT

A control device for an AC rotating machine includes a voltage command calculation means (1) that calculates voltage commands on rotation two axes and a voltage applying means (2) that applies a voltage to an AC rotating machine (3), based on voltage commands on the rotation two axes outputted by the voltage command calculation means (1); the voltage command calculation means (1) calculates first-axis and second-axis voltage commands on the rotation two axes and reduces the limit value of the second-axis voltage command in proportion to the squared first-axis voltage command.

9 Claims, 12 Drawing Sheets

(51) Int. Cl.
*H02P 23/00* (2006.01)
*B62D 5/04* (2006.01)

(56) References Cited

U.S. PATENT DOCUMENTS

| | | | | |
|---|---|---|---|---|
| 6,979,975 | B1* | 12/2005 | Kinpara et al. | 318/400.02 |
| 7,034,493 | B2* | 4/2006 | Yoshimoto et al. | 318/629 |
| 7,199,548 | B2* | 4/2007 | Inaguma et al. | 318/727 |
| 7,230,398 | B2* | 6/2007 | Miyauchi | 318/400.01 |
| 7,276,876 | B2* | 10/2007 | Kaneko et al. | 318/716 |
| 7,800,337 | B2* | 9/2010 | Kinpara et al. | 318/712 |
| 8,035,334 | B2* | 10/2011 | Kobayashi et al. | 318/812 |
| 8,115,431 | B2* | 2/2012 | Hashimoto et al. | 318/400.02 |
| 8,264,181 | B2* | 9/2012 | Yamakawa et al. | 318/432 |
| 8,523,296 | B2* | 9/2013 | Kikuchi et al. | 303/151 |
| 2004/0195993 | A1* | 10/2004 | Yoshimoto et al. | 318/802 |
| 2005/0127857 | A1* | 6/2005 | Miyauchi | 318/254 |
| 2006/0113948 | A1* | 6/2006 | Kaneko et al. | 318/716 |
| 2007/0216342 | A1 | 9/2007 | Tobari et al. | |
| 2007/0222288 | A1* | 9/2007 | Kikuchi et al. | 303/151 |
| 2008/0180054 | A1* | 7/2008 | Kinpara et al. | 318/720 |
| 2010/0039056 | A1* | 2/2010 | Kobayashi et al. | 318/400.35 |

FOREIGN PATENT DOCUMENTS

| | | |
|---|---|---|
| JP | 2007-252052 A | 9/2007 |
| JP | 2009-220665 A | 10/2009 |
| JP | 2009-290929 A | 12/2009 |

\* cited by examiner

FIG. 7

|  | UPPER LIMIT VALUE | LOWER LIMIT VALUE |
|---|---|---|
| ROTATION SPEED ≧ 0 | L1 | −L2 |
| ROTATION SPEED = 0 | L2 | −L2 |
| ROTATION SPEED < 0 | L2 | −L1 |

FIG. 11

|  | UPPER LIMIT VALUE | LOWER LIMIT VALUE |
|---|---|---|
| ROTATION SPEED ≧ A1 | L1 | −L2 |
| −A1 ≦ ROTATION SPEED < A1 | L2 | −L2 |
| ROTATION SPEED < −A1 | L2 | −L1 |

CONTROL DEVICE FOR ALTERNATING CURRENT ROTATING MACHINE AND ELECTRIC POWER STEERING DEVICE EQUIPPED WITH CONTROL DEVICE FOR ALTERNATING CURRENT ROTATING MACHINE

CROSS REFERENCE TO RELATED APPLICATIONS

This application is a National Stage of International Application No. PCT/JP2011/076520 filed Nov. 17, 2011, the contents of all of which are incorporated herein by reference in their entirety.

TECHNICAL FIELD

The present invention relates to a control device for an alternating current rotating machine (hereinafter, referred to as an AC rotating machine) that controls an AC rotating machine, based on the voltage commands on rotation two axes, and to an electric power steering device equipped with the control device for an AC rotating machine.

BACKGROUND ART

In the case where an AC voltage is applied to an AC rotating machine by use of an electric-power converter for converting a DC voltage into an AC voltage, the upper limit of the amplitude of the voltage applied by the electric-power converter to the AC rotating machine is determined by the amplitude of the DC voltage. In the case where the electric-power converter controls the voltages to be applied to the AC rotating machine based on the voltage commands on the rotation two axes, the induction voltage in the AC rotating machine increases in proportion to the rotation speed of the AC rotating machine and hence it is also required to enlarge the voltage commands on the rotation two axes; however, when reaching the upper limit of the voltage amplitude determined by the amplitude of the DC voltage, the amplitude of the voltage to be applied to the AC rotating machine cannot be made larger than the upper limit. In contrast, the phase of the voltage to be applied to the AC rotating machine can arbitrarily be given.

For example, in a conventional control device for an AC rotating machine disclosed in Patent Document 1, an electric-power conversion system, in which the currents of two phases out of the output currents of three phases of which are detected, the detected currents are coordinate-converted into the components of two perpendicularly intersecting axes in a rotating coordinate system, a voltage command obtained by amplifying the difference between the current commands is coordinate-converted again so that voltage commands of three phases are calculated, and then the electric-power conversion system is controlled in such a way that the output voltage of the electric-power conversion system follows the voltage commands, includes a first limiting circuit that limits the absolute value of a d-axis-component difference amplification signal to a first limit value; a control value calculation circuit that calculates a q-axis voltage limit value vqm, based on a d-axis-component voltage command value Vd*, which is the output signal of the first limiting circuit, and a second limit value vm and in accordance with the relationship "$V_{qm}=(V_m^2-V_{d*}^2)^{1/2}$"; and a second limit value circuit that limits the absolute value of the d-axis-component difference signal to a limit value $v_{qm}$, which is calculated by the control value calculation circuit. In addition, the output signal of the second limit value circuit is utilized as a q-axis-component voltage command $V_{q*}$. By configuring the control device in such a way as described above, control is performed in such a way that when the rotation speed of the AC rotating machine rises and the amplitude of the voltage outputted by the electric-power converter reaches the second limit value $V_m$, the amplitude of the voltage applied to the AC rotating machine is held at the second limit value $V_m$ and the phase of the voltage applied to the AC rotating machine is shifted by $\tan^{-1}(V_{qm}/V_{d*})$ from the d axis.

A conventional control device for an AC rotating machine disclosed in Patent Document 2 performs control in such a way that the output voltage command value of an electric-power converter that drives a permanent-magnet motor based on d-axis and q-axis current command values, d-axis and q-axis current detection values, a frequency calculation value, and a motor constant setting value, and in such a way that when the output voltage value of the electric-power converter is limited, a command value for the phase error, which is the difference between the control reference axis and the motor magnetic flux axis, is created based on the difference between the q-axis current command value and the q-axis current detection value. By configuring the control device in such a way as described above, control is performed in such a way that when the rotation speed of the AC rotating machine rises and the amplitude of the voltage outputted by the electric-power converter reaches an upper limit value, the difference between the q-axis current command value and the q-axis current detection value increases and a command for the phase error, which is the difference between the control reference axis and the motor magnetic flux axis, is given based on the difference so that the phase of the voltage applied to the AC rotating machine is shifted.

PRIOR ART REFERENCE

Patent Document

Patent Document 1: Japanese Patent Application Laid-Open No. H2-111281
Patent Document 2: Japanese Patent Application Laid-Open No. 2007-252052

DISCLOSURE OF THE INVENTION

Problems to be Solved by the Invention

The conventional control device for an AC rotating machine disclosed in Patent document 1 calculates the q-axis voltage limit value $V_{qm}$, based on the d-axis-component voltage command value $V_{d*}$ and the second limit value $V_m$ and in accordance with the relationship "$V_{qm}=(V_m^2-V_{d*}^2)^{1/2}$"; therefore, there has been a problem that when $V_{d*}$ approaches $V_m$, the voltage phase changes abruptly and hence the d-axis-component difference amplification signal becomes oscillative, and as a result, the d-axis current hunts. Moreover, in the conventional control device for an AC rotating machine disclosed in Patent Document 1, the first limiting circuit limits the d-axis-component voltage command value $V_{d*}$ to the first limit value or smaller and the q-axis voltage limit value $V_{qm}$ is given through a square root calculation based on the d-axis-component voltage command value $V_{d*}$; however, the first limiting circuit limits the d-axis-component voltage command value $V_{d*}$ so that the square root value does not become a negative value. As a result, the range that can be taken by the calculation of the q-axis voltage limit value $V_{qm}$ is from zero to the second limit value $V_m$ and the q-axis voltage limit value $V_{qm}$ cannot become a negative value; thus, there has been a problem that the operative voltage phase is limited to the range of 0° to 180° with respect to the d axis.

Furthermore, when the output voltage value of the electric-power converter is limited, the conventional control device for an AC rotating machine disclosed in Patent Document 2 creates a command value for the phase error, which is the difference between the control reference axis and the motor magnetic flux axis, based on the difference between the q-axis current command value and the q-axis current detection value; therefore, there can be solved the problem that when $V_{d*}$ approaches $V_m$, the voltage phase changes abruptly or the operative voltage phase is limited to the range of 0° to 180° with respect to the d axis. However, there has been a problem that because the control is switched between the case where the output voltage value of the electric-power converter is limited and the case where the output voltage value of the electric-power converter is not limited, discontinuous operation occurs and hence a torque ripple is caused due to the switching.

The present invention has been implemented in order to solve the foregoing problems; the objective thereof is to obtain a control device for an AC rotating machine that can control the voltage phase at a time when the voltage is saturated in such a way that the voltage phase becomes a desired phase, without implementing control switching accompanied by discontinuous operation.

Means for Solving the Problems

A control device for an AC rotating machine according to the present invention includes a voltage command calculation means that calculates voltage commands on rotation two axes and a voltage applying means that applies a voltage to an AC rotating machine, based on voltage commands on the rotation two axes outputted by the voltage command calculation means; the voltage command calculation means calculates first-axis and second-axis voltage commands on the rotation two axes and reduces the limit value of the second-axis voltage command in proportion to the squared first-axis voltage command.

Advantage of the Invention

In the control device for an AC rotating machine according to the present invention, the limit value of the second-axis voltage command decreases in proportion to the squared first-axis voltage command; therefore, in the case where the voltage applying means is voltage-saturated, the amplitude of the voltage outputted by the voltage applying means is constant and the voltage phase with respect to the first axis can linearly be changed in accordance with the change in the first-axis voltage command. As a result, a sudden change in the voltage phase is suppressed and hence stable control can be performed even when the voltage phase approaches the first axis.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 7 is a table in which there are described upper and lower limit values outputted by an upper/lower limit value calculation device according to Embodiment 3 of the present invention;

FIG. 11 is a table in which there are described upper and lower limit values outputted by an upper/lower limit value calculation device according to Embodiment 3 of the present invention.

BEST MODE FOR CARRYING OUT THE INVENTION

Embodiment 1

Figure 1:
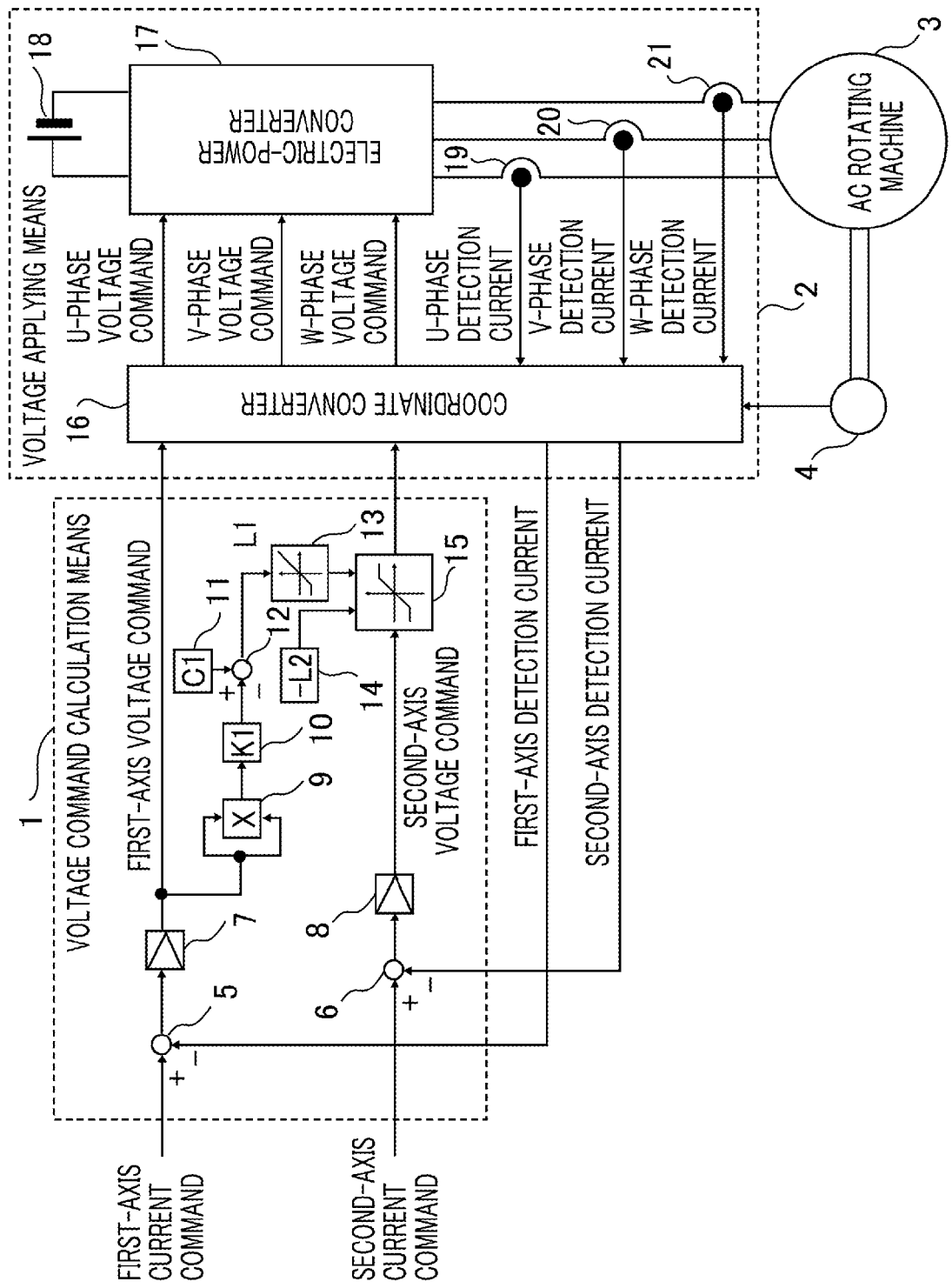
FIG. 1 is a diagram illustrating the overall configuration of a control device for an AC rotating machine according to Embodiment 1 of the present invention.

FIG. 1 is a diagram illustrating the overall configuration of a control device for an AC rotating machine according to Embodiment 1 of the present invention. In FIG. 1, a voltage command calculation means 1 that calculates voltage commands on the rotation two axes outputs first-axis and second-axis voltage commands, based on first-axis and second-axis current commands and first-axis and second-axis detection currents. The first axis and the second axis are the respective axes of rotation two axes that each rotate in synchronization with the rotation of an AC rotating machine.

A voltage applying means 2 applies three-phase voltages to an AC rotating machine 3, based on the first-axis and second-axis voltage commands and the rotation position of the AC rotating machine 3, and coordinate-converts three-phase currents of the AC rotating machine 3 so as to output the coordinate-converted three-phase currents, as the first-axis and second-axis detection currents. A rotation-position detection device 4 detects the rotation position of the AC rotating machine 3 and then outputs the detected rotation position to the voltage applying means 2.

The internal configuration of the voltage command calculation means 1 will be explained. A subtractor 5 subtracts the first-axis detection current from the first-axis current command and then outputs a first-axis current difference. Similarly, a subtractor 6 subtracts the second-axis detection current from the from the second-axis current command and then outputs a second-axis current difference. A difference amplifier 7 amplifies the first-axis current difference and then outputs it as the first-axis voltage command. The amplification of the current difference may be an either proportional calculation or a proportional-integral calculation. Similarly, a difference amplifier 8 amplifies the second-axis current difference and then outputs it as the second-axis voltage command. The amplification of the current difference may be an either proportional calculation or a proportional-integral calculation.

A multiplier 9 raises the first-axis voltage command to the second power and then outputs the value to a proportional calculation device 10. The proportional calculation device 10 multiplies the squared first-axis voltage command by K1 and then outputs a value proportional to the squared first-axis voltage command. K1 is an arbitrary positive number. A constant setting device 11 outputs an arbitrary positive number C1, which has been preliminarily set. A subtractor 12 subtracts the value proportional to the squared first-axis voltage command, outputted by the proportional calculation device 10, from C1 obtained from the constant setting device 11 and outputs the result of the subtraction. When the value outputted by the subtractor 12 is defined as L1, L1 is given by the equation (1).

$$L1 = C1 - K1 \times (\text{the first-axis voltage command})^2 \quad (1)$$

When the output L1 of the subtractor 12 is the same as or larger than a predetermined value L1min, a lower limit value limiting device 13 outputs L1 and when L1 is smaller than the predetermined value, the lower limit value limiting device 13 outputs L1min; thus, the lower limit value limiting device 13 outputs L1 while limiting L1 to L1min or larger. A constant setting device 14 outputs a value −L2 obtained by inversing the sign of the arbitrary positive number L2, which has been preliminarily set. −L2 is set to a value that is smaller than the lower limit value L1min of L1. In other words, the lower limit value limiting device 13 limits L1 to an arbitrary value that is the same as or larger than −L2; however, the arbitrary value L1min may be a positive value, zero, or a negative value larger than −L2. The lower limit value limiting device 13 according to Embodiment 1 sets L1min to a negative value and outputs L1 while limiting L1 to L1min or larger.

A limiting device 15 limits the second-axis voltage command in such a way that the second-axis voltage command falls within a range from the upper limit value to the lower limit value; when the second-axis voltage command obtained from the difference amplifier 8 is larger than L1 obtained from the lower limit value limiting device 13, the limiting device 15 outputs L1, and when the second-axis voltage command obtained from the difference amplifier 8 is smaller than −L2 obtained from the constant setting device 14, the limiting device 15 outputs −L2; in other cases, the limiting device 15 outputs the second-axis voltage command obtained from the difference amplifier 8.

In such a manner as described above, the voltage command calculation means 1 outputs the output of the difference amplifier 7 and the output of the limiting device 15, as the first-axis voltage command and the second-axis voltage command, respectively, to the voltage applying means 2. With the foregoing configuration, the voltage command calculation means 1 calculates the first-axis and second-axis voltage commands on the rotation two axes and reduces the limit value of the second-axis voltage command in proportion to the squared first-axis voltage command.

Next, the internal configuration of the voltage applying means 2 will be explained. Based on the rotation position obtained from the rotation-position detection device 4, a coordinate converter 16 coordinate-converts the first-axis and second-axis voltage commands obtained from the voltage command calculation means 1 and outputs the coordinate-converted first-axis and second-axis voltage commands, as U-phase, V-phase, and W-phase voltage commands, which are three-phase AC voltage commands, and coordinate-converts U-phase, V-phase, and W-phase detection currents, which are three-phase AC detection currents, so as to output the coordinate-converted detection currents, as the first-axis and second-axis detection currents. An electric-power converter 17 that converts a DC voltage obtained from a DC power source 18 into an AC voltage applies U-phase, V-phase, and W-phase voltages based on the U-phase, V-phase, and W-phase voltage commands, respectively, to the AC rotating machine 3. A current detection device 19 detects the U-phase current of the AC rotating machine 3 and then outputs the detected U-phase current, as the U-phase detection current, to the coordinate converter 16. Similarly, a current detection device 20 detects the V-phase current of the AC rotating machine 3 and then outputs the detected V-phase current, as the V-phase detection current, to the coordinate converter 16; a current detection device 21 detects the W-phase current of the AC rotating machine 3 and then outputs the detected W-phase current, as the W-phase detection current, to the coordinate converter 16. With the foregoing configuration, the voltage applying means 2 applies a voltage to the AC rotating machine 3, based on the voltage commands on the rotation two axes outputted by the voltage command calculation means 1.

Figure 2:
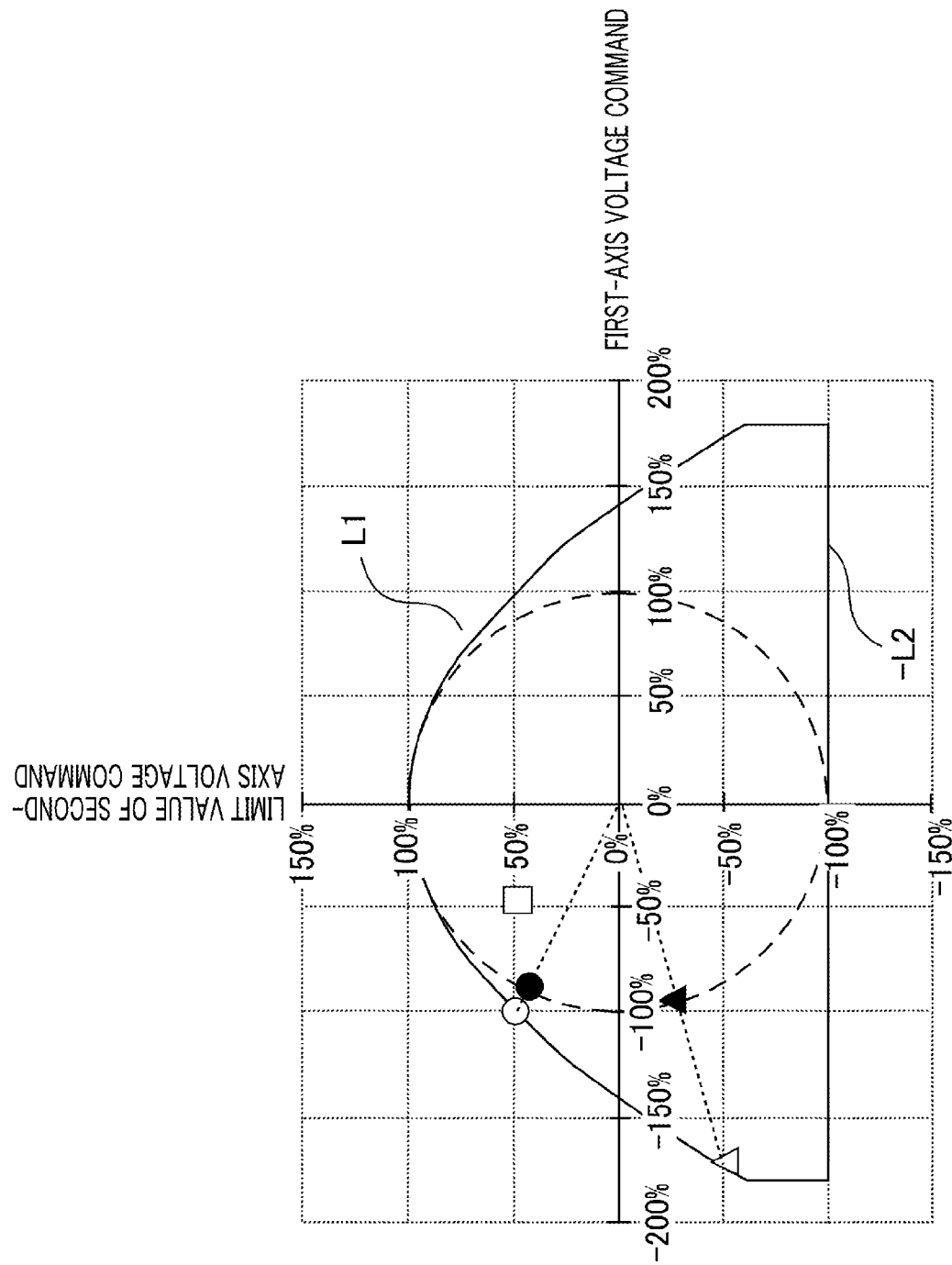
FIG. 2 is a chart representing the relationship between the first-axis voltage command and the limit value of the second-axis voltage command according to Embodiment 1 of the present invention.

FIG. 2 is a chart representing the relationship between the first-axis voltage command and the limit value of the second-axis voltage command according to Embodiment 1 of the present invention. In FIG. 2, the solid line is a chart representing the relationship between the first-axis voltage command outputted by the voltage command calculation means 1 and the limit value of the second-axis voltage command outputted by the voltage command calculation means 1. The circle drawn with the broken line represents the range of a voltage that can be applied to the AC rotating machine 3 by the electric-power converter 17. The electric-power converter 17 can apply a voltage of an arbitrary phase to the AC rotating machine 3; however, the maximum amplitude value of the voltage is a finite value corresponding to the DC voltage obtained from the DC power source 18. On the second graded scale, the maximum amplitude value of the voltage applied to the AC rotating machine 3 by the electric-power converter 17 is set to 100%. The upper limit value L1 of the second-axis voltage command is a value at a time when C1 in the equation (1) is set to the "maximum amplitude value of the voltage that can be outputted by the electric-power converter 17", i.e., to the amplitude of 100% and K1 is set to 0.5.

In FIG. 2, in the case where the first-axis voltage command is −100%, the upper limit value L1 and the lower limit value −L2 in the limiting values of the second-axis voltage command are +50% and −100%, respectively; therefore, the second-axis voltage command can be within a range from −100% to +50%. In the case where the first-axis voltage command is +150%, the upper limit value L1 and the lower limit value −L2 in the limiting values of the second-axis voltage command are −12.5% and −100%, respectively; therefore, the second-axis voltage command can be within a range from −100% to −12.5%.

For example, when the first-axis voltage command and the second-axis voltage command are set to −50% and +50%, respectively, this condition is indicated by the mark "□" inside the broken-line circle; thus, the first-axis voltage command and the second-axis voltage command make it possible to apply the respective voltages that coincide with desired values to the AC rotating machine 3. In addition, for example, in the case where the first-axis voltage command and the second-axis voltage command outputted by the difference amplifier 8 are set to −100% and +100%, respectively, the limiting device 15 limits the second-axis voltage command to +50%. In this case, the amplitude of the vectorial sum of the first-axis voltage command and the second-axis voltage command exceeds 100% and this condition is indicated by the mark "○" outside the broken-line circle.

In the case where the vectorial sum of the first-axis voltage command and the second-axis voltage command is outside the broken-line circle, the voltage that is applied to the AC rotating machine 3 by the electric-power converter 17 has the same phase as the mark "○" and the amplitude of 100%; thus, the electric-power converter 17 outputs a voltage the same as that of the mark "●" on the broken-line circle.

In Embodiment 1, as the limit value L1 of the second-axis voltage command, not only a positive value but also a negative value is allowed. In the case where the first-axis voltage command and the second-axis voltage command outputted by the difference amplifier 8 are set to −173% and +100%, respectively, the limiting device 15 limits the second-axis voltage command to −50%. In this case, the amplitude of the vectorial sum of the first-axis voltage command and the second-axis voltage command exceeds 100% and this condition is indicated by the mark "Δ" outside the broken-line circle. Because the vectorial sum of the first-axis voltage command and the second-axis voltage command is outside the broken-line circle, the voltage that is applied to the AC rotating machine 3 by the electric-power converter 17 has the same phase as the mark "Δ" and the amplitude of 100%; thus, the electric-power converter 17 outputs a voltage the same as that of the mark "▲" on the broken-line circle. As can be seen from the mark "▲", in the region where the limit value L1 of the second-axis voltage command is negative, the phase of the voltage that is applied to the AC rotating machine 3 by the electric-power converter 17 shifts by more than 180° from the first axis.

As described above, the voltage command calculation means 1 according to Embodiment 1 allows not only a positive value but also a negative value, as the limit value L1 of the second-axis voltage command that decreases in proportion to the squared first-axis voltage command; therefore, in the case of FIG. 2, even when the second-axis voltage command that has not been limited by the limiting device 15 is a positive value, the second-axis voltage command that has been limited by the limiting device 15 can be a negative when the amplitude of the first-axis voltage command is larger than 141%; thus, there is obtained an effect that the voltage phase can be shifted by more than 180° from the first axis.

Figure 3:
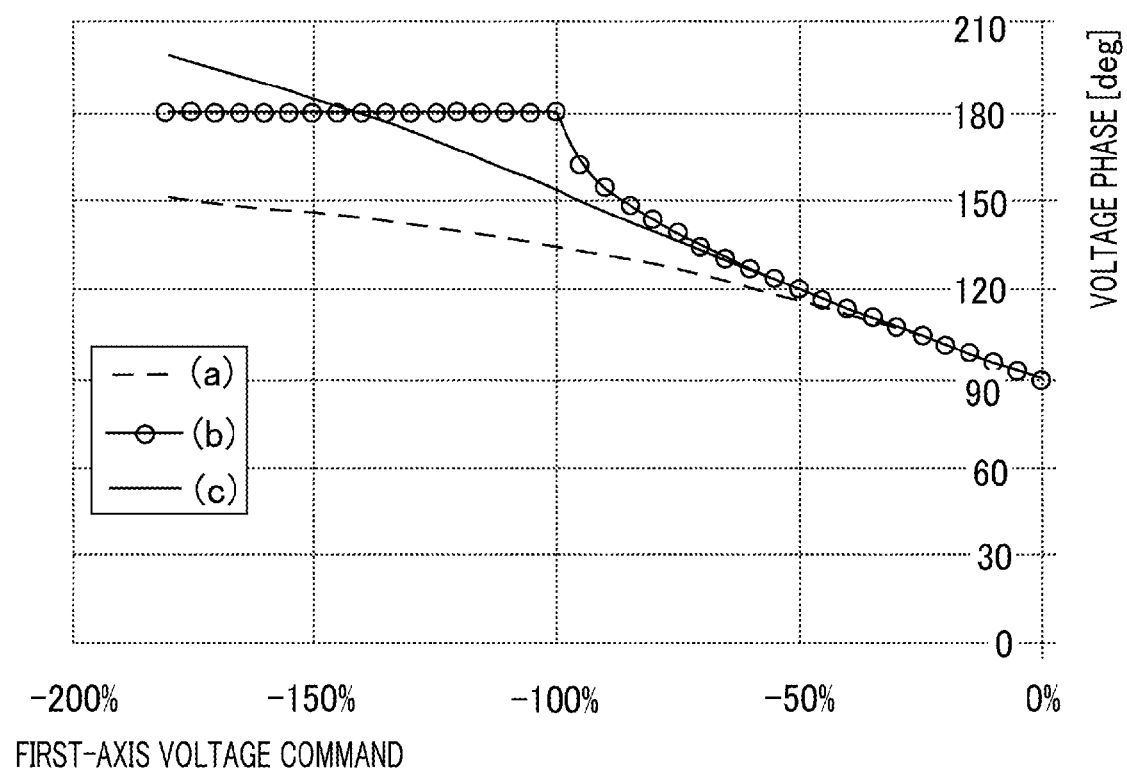
FIG. 3 is a graph representing the relationship between the "first-axis voltage command" with respect to the first axis and the voltage phase of the "limited second-axis voltage command" according to Embodiment 1 of the present invention.

FIG. 3 is a graph representing the relationship between the "first-axis voltage command" with respect to the first axis and the voltage phase of the "limited second-axis voltage command" at a time when the vectorial sum of the "first-axis voltage command" and the "unlimited second-axis voltage command" exceeds 100%, i.e., at a time when the electric-power converter 17 is voltage-saturated, the voltage amplitude becomes 100%, and hence only the voltage phase changes. In FIG. 3, the sign of the "first-axis voltage command" is negative, and the sign of the "unlimited second-axis voltage command" is positive. The curves (a), (b), and (c) have been drawn in accordance with the following conditions:

(a) When the upper limit of the second-axis voltage command is limited to 100%

(b) When as is the case with Patent Document 1, the upper limit of the second-axis voltage command is limited through the following equation.

[the upper limit of the second-axis voltage command]=([the squared maximum value of the voltage amplitude]−[the squared first-axis voltage command])$^{1/2}$ (2)

(c) When the upper limit of the second-axis voltage command is limited by the limiting device 15 according to the present invention As can be seen from FIG. 3, in the case where the first-axis voltage command is approximately −50% to 0%, no significant difference exists among the curves (a), (b), and (c). In contrast, in the case where the first-axis voltage command is approximately −150% to −50%, differences exist among the curves (a), (b), and (c). The curve (a) is obtained when the upper limit of the second-axis voltage command is limited to 100%. In the case where the first-axis voltage command is within a range approximately from −150% to −50%, the change in the voltage phase vs. the first-axis voltage command decreases, i.e., the voltage phase scarcely changes even when the first-axis voltage command changes. In this situation, due to the voltage saturation of the electric-power converter 17, the voltage amplitude is constant (100%); therefore, when the voltage phase does not change, the responsiveness of current control remarkably decreases. Even when the amplitude of the first-axis voltage command is enlarged in such a way as to reach the outside of the represented range, the outputtable voltage phase becomes smaller than 180°. Accordingly, the voltage phase cannot be shifted by more than 180° from the first axis.

The curve (b) is plotted following Patent Document 1. In the case where the first-axis voltage command is within a range approximately from −100% to −50%, the change in the voltage phase vs. the first-axis voltage command increases, especially, in the case where the first-axis voltage command is in the vicinity of a range from −100% to −90%, the voltage phase drastically changes even when the first-axis voltage command slightly changes. In other words, when it is tried to control the voltage phase to be 150° to 180° with respect to the first axis, the voltage phase changes even when the first-axis voltage command slightly fluctuates; thus, the voltage phase is liable to vibrate or hunt. Because the calculation through the equation (2) utilizes a square root, the calculation cannot be implemented when the "squared first-axis voltage command" becomes larger than the squared maximum value of the voltage amplitude"; therefore, the first-axis voltage command should be 100% or smaller and hence the voltage phase cannot be shifted by more than 180° from the first axis.

The curve (c) is obtained by limiting the upper limit of the second-axis voltage command by the limiting device 15 according to Embodiment 1. Here, C1 in the equation (1) is set to the "maximum amplitude value of the voltage that can be outputted by the electric-power converter 17", i.e., to the amplitude of 100% and K1 is set to 0.5. Even in the case where the first-axis voltage command is within the range from −150% to −50%, the voltage phase vs. the first-axis voltage command hardly changes from the voltage phase at a time when the first-axis voltage command is within the range from −50% to 0%. As described above, in the case where the voltage amplitude is constant (100%) due to the voltage saturation of the electric-power converter 17, the limiting device 15 according to Embodiment 1 makes it possible to linearly change the voltage phase in accordance with the change in the amplitude of the first-axis voltage command.

As described above, the lower limit value limiting device 13 sets L1min to a negative value and outputs L1 while controlling L1 to be the same as or larger than L1min; therefore, when the amplitude of the first-axis voltage command exceeds 141%, the upper limit value of the limiting device 15 changes from a positive value to a negative value, as represented in FIG. 2. Accordingly, when the first-axis voltage command is set to −140% or smaller so that the amplitude of the first-axis voltage command exceeds 141%, it is made possible to shift the voltage phase by more than 180% from the first axis. In other words, the voltage command calculation means 1 allows not only a positive value but also a negative value, as the limit value of the second-axis voltage command that decreases in proportion to the squared first-axis voltage command; therefore, there is obtained an effect that the voltage phase can be shifted by more than 180° from the first axis. Cancellation of the restriction on the voltage phase with respect to the first axis also cancels the restriction on the current range that can be controlled by the AC rotating machine 3; thus, the AC rotating machine 3 can stably perform the control up to a higher rotation speed.

As described above, the conventional control device for an AC rotating machine disclosed in Patent Document 1 has a problem that when the electric-power converter is voltage-saturated and the first-axis voltage command is in a range of approximately from −100% to −90%, the voltage phase drastically changes even when the first-axis voltage command slightly changes and hence the voltage phase is liable to vibrate or hunt. In contrast, in the control device for an AC rotating machine according to Embodiment 1, the limit value of the second-axis voltage command decreases in proportion to the squared first-axis voltage command; therefore, in the case where the electric-power converter 17 of the voltage applying means 2 is voltage-saturated, the amplitude of the voltage outputted by the electric-power converter 17 is constant and the voltage phase with respect to the first axis can linearly be changed in accordance with the change in the first-axis voltage command. As a result, there is obtained an effect that stable control can be performed even when the voltage phase with respect to the first axis is 180°, i.e., even when the voltage phase approaches the first axis.

In the conventional control device for an AC rotating machine disclosed in Patent Document 1, because the calculation of the limit value of the second-axis voltage command utilizes a square root, the first-axis voltage command should be 100% or smaller; as a result, there has been a problem that the voltage phase with respect to the first axis cannot be increased by more than 180°. In contrast, the control device for an AC rotating machine according to Embodiment 1 allows not only a positive value but also a negative value, as the limit value of the second-axis voltage command that decreases in proportion to the squared first-axis voltage command; therefore, even when due to voltage saturation of the electric-power converter 17, the voltage amplitude is constant (100%), the second-axis voltage command that is limited by the limiting device 15 can be set to a negative value; thus, there is obtained an effect that the voltage phase with respect to the first axis can be controlled within a wide range exceeding the range of 0° to 180°.

In a conventional control device for an AC rotating machine disclosed in Patent Document 2, there has been a problem that because the control is switched between the case where the output voltage value of the electric-power converter is limited and the case where the output voltage value of the electric-power converter is not limited, discontinuous operation occurs and hence a torque ripple is caused due to the switching. In contrast, the control device for an AC rotating machine according to Embodiment 1 merely control the upper limit value and the lower limit value of the second-axis voltage command by use of the limiting device 15; therefore, no extra switching of control is required. Accordingly, there is obtained an effect that even when due to the voltage saturation of the electric-power converter 17, the voltage amplitude is approximately 100%, no torque ripple caused by the control switching occurs.

In Embodiment 1, the first axis on the rotation two axes is set to a direction having the same phase as the rotor magnetic flux of the AC rotating machine 3, and the second axis on the rotation two axes is set to a direction that is perpendicular to the first axis on the rotation two axes. Specifically, the coordinate conversion by the coordinate converter 16 may be implemented in accordance with a known method in such a way that the first axis on the rotation two axes rotates in synchronization with the direction having the same phase as the rotor magnetic flux of the AC rotating machine 3. In the case where the first axis on the rotation two axes is set to a direction having the same phase as the rotor magnetic flux of the AC rotating machine 3, the second-axis voltage command outputted by the difference amplifier 8 is limited by the limiting device 15 in accordance with the amplitude of the first-axis voltage command; however, the first-axis voltage command outputted by the difference amplifier 7 is not limited; thus, the first-axis voltage command acts in such a way that the current difference in the direction having the same phase as the rotor magnetic flux becomes zero. In the case where the first-axis voltage command acts in such a manner as described above, the limiting device 15, in some cases, cannot control the current in the direction perpendicular to the rotor magnetic flux to a desired value; however, because the output of the difference amplifier 7 is not limited, the current in the direction having the same phase as the rotor magnetic flux can be controlled to a desired value. Accordingly, when the first axis on the rotation two axes is set to a direction having the same phase as the rotor magnetic flux, the current can be controlled to a desired value in a direction that cancels the rotor magnetic flux; thus, the induction voltage can be reduced. As a result, there is obtained an effect that the AC rotating machine 3 can be operated in such a way that the rotation speed thereof falls into a higher range.

Embodiment 2

In the case where the first axis on the rotation two axes is set to a direction having the same phase as the rotor magnetic flux of the AC rotating machine and the second axis on the rotation two axes is set to a direction that is perpendicular to the first axis on the rotation two axes, the sign of the second-axis voltage command that has not been limited by the limiting device 15 depends on the sign of the rotation speed of the AC rotating machine 3. In Embodiment 1, the lower limit value limiting device 13 sets L1min to a negative value and outputs L1 while limiting L1 to L1min or larger. When the second-axis voltage command is larger than L1 obtained from the lower limit value limiting device 13, the limiting device 15 outputs L1; when the second-axis voltage command obtained from the difference amplifier 8 is smaller than −L2 obtained from the constant setting device 14, the limiting device 15 outputs −L2; in other cases, the limiting device 15 outputs the second-axis voltage command obtained from the difference amplifier 8. In the case of this configuration, depending on the sign of the rotation speed of the AC rotating machine 3, even when the rotation speed of the AC rotating machine is high, the second-axis voltage command does not decrease in proportion to the squared first-axis voltage command and hence the rotation speed of the AC rotating machine vs. output torque characteristic varies depending on the sign of the rotation speed.

Figure 4:
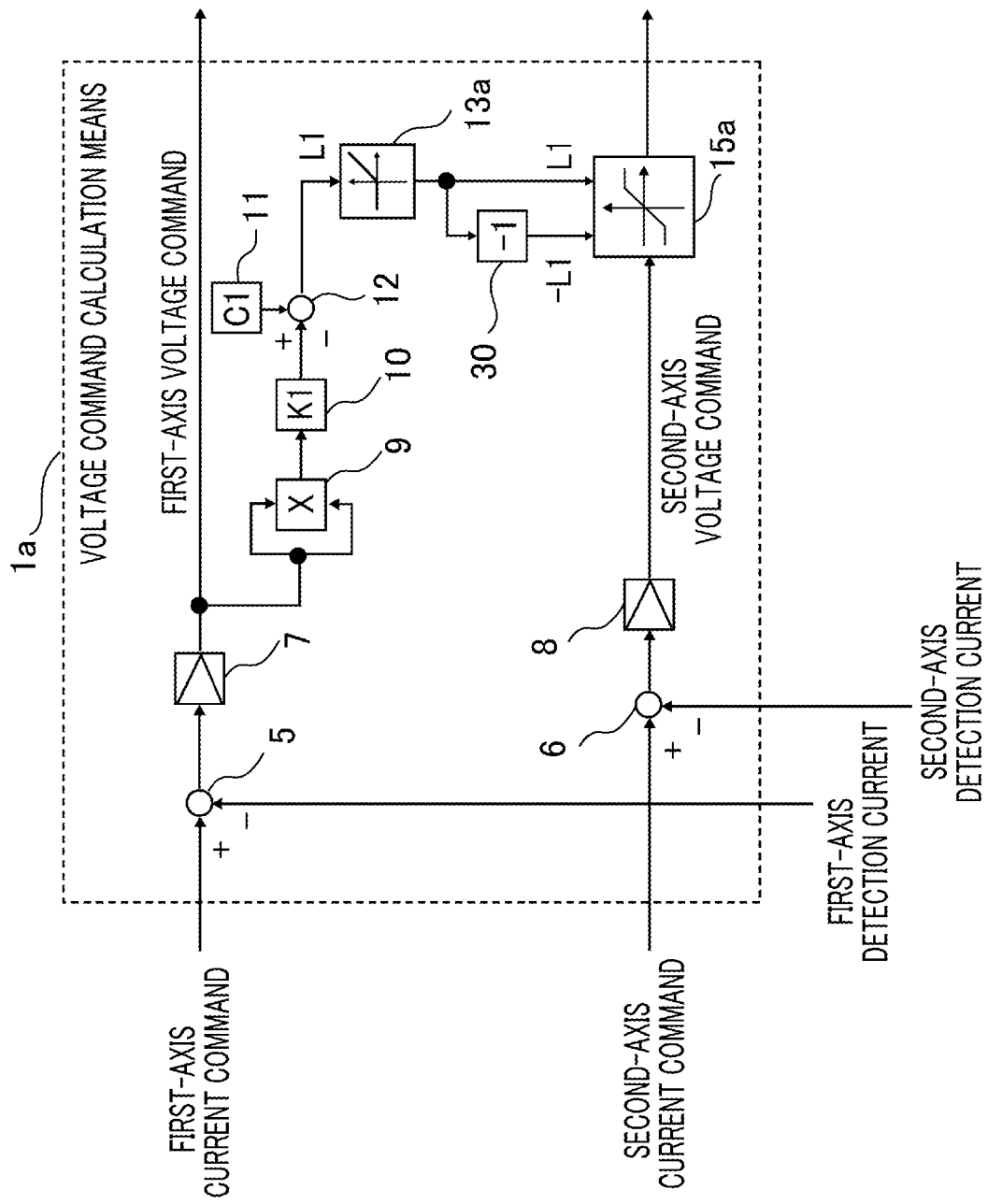
FIG. 4 is a diagram illustrating the internal configuration of a voltage command calculation unit of a control device for an AC rotating machine according to Embodiment 2 of the present invention.

Thus, Embodiment 2 is provided with a voltage command calculation means that prevents the rotation speed of the AC rotating machine vs. output torque characteristic from depending on the sign of the rotation speed of the AC rotating machine. FIG. 4 is a diagram illustrating a voltage command calculation means 1a of a control device for an AC rotating machine according to Embodiment 2 of the present invention; the same reference characters as those in Embodiment 1 denote the same or similar constituent elements. A lower limit value limiting device 13a is the same as the lower limit value limiting device in Embodiment 1 in that when the output L1 of the subtractor 12 is the same as or larger than a predetermined value L1min, the lower limit value limiting device 13a outputs L1 and when L1 is smaller than the predetermined value, the lower limit value limiting device 13a outputs L1min so that the lower limit value limiting device 13a outputs L1 while limiting L1 to L1min or larger; however, the lower limit value limiting device 13a differs from the lower limit value limiting device 13 in that it sets L1min to zero and controls L1 to be zero or larger. A sign inverting device 30 inverts the sign of L1 obtained from the lower limit value limiting device 13a and then outputs −L1.

A limiting device 15a limits the second-axis voltage command in such a way that the second-axis voltage command falls within the range from the upper limit value to the lower limit value; when the second-axis voltage command obtained from the difference amplifier 8 is larger than L1 obtained from the lower limit value limiting device 13a, the limiting device 15a outputs L1, and when the second-axis voltage command obtained from the difference amplifier 8 is smaller than −L1 obtained from the sign inverting device 30, the limiting device 15a outputs −L1; in other cases, the limiting device 15a outputs the second-axis voltage command obtained from the difference amplifier 8. In such a manner as described above, the voltage command calculation means 1a outputs the output of the difference amplifier 7 and the output of the limiting device 15a, as the first-axis voltage command and the second-axis voltage command, respectively, to the voltage applying means 2.

Figure 5:
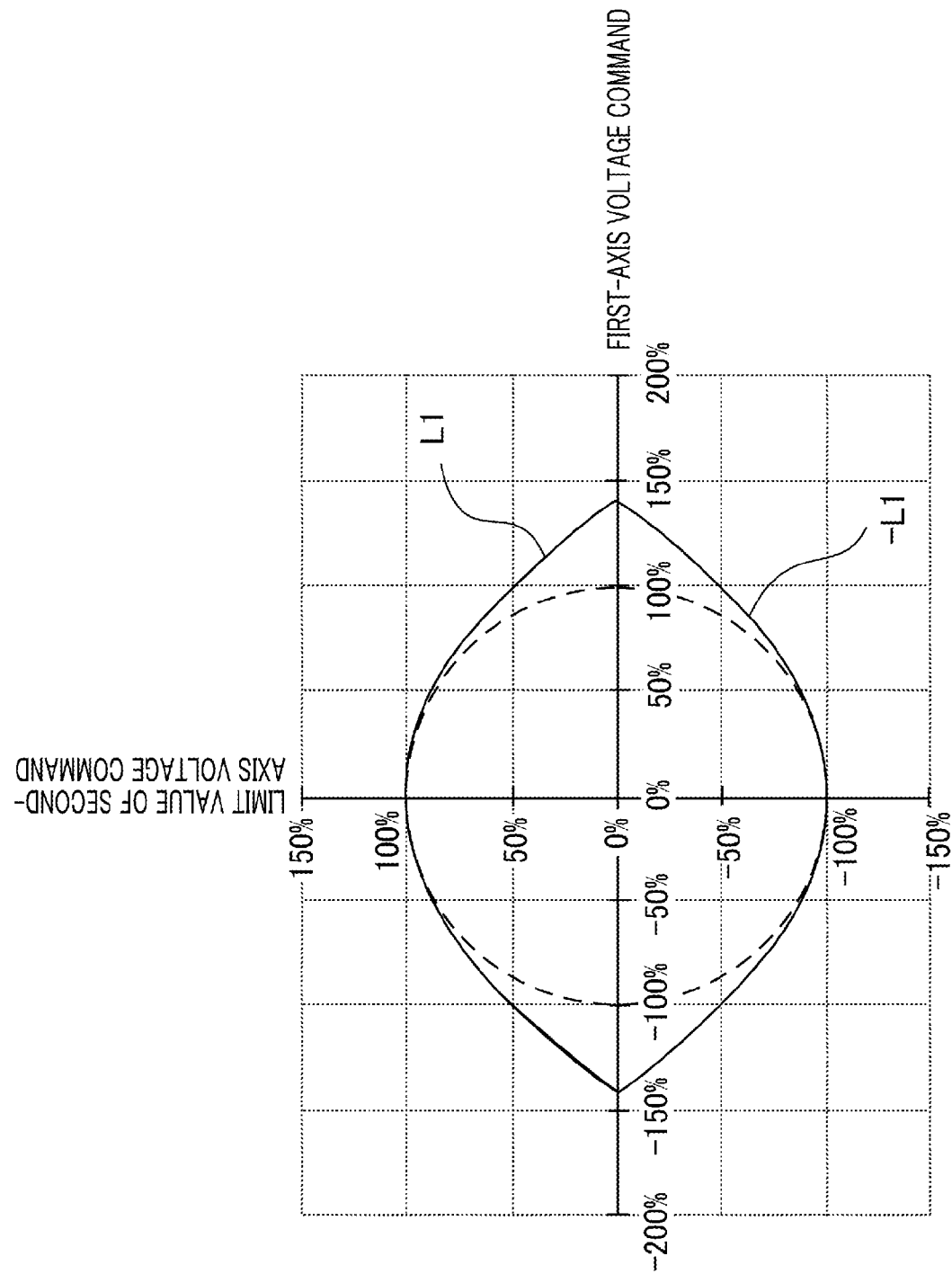
FIG. 5 is a chart representing the relationship between the first-axis voltage command and the limit value of the second-axis voltage command according to Embodiment 2 of the present invention.

FIG. 5 is a chart representing the relationship between the first-axis voltage command and the limit value of the second-axis voltage command according to Embodiment 2 of the present invention. In FIG. 5, the solid line is a chart representing the relationship between the first-axis voltage command outputted by the voltage command calculation means 1a and the limit value of the second-axis voltage command outputted by the voltage command calculation means 1a. The circle drawn with the broken line represents the range of a voltage that can be applied to the AC rotating machine 3 by the electric-power converter 17. On the second graded scale, the maximum amplitude value of the voltage applied to the AC rotating machine 3 by the electric-power converter 17 is set to 100%, as is the case with FIG. 2.

In Embodiment 1, when the unlimited second-axis voltage command is larger than L1, the limit value L1 of the second-axis voltage command decreases in proportion to the squared first-axis voltage command; however, when the unlimited second-axis voltage command is smaller than −L2, the limited second-axis voltage command does not decrease in proportion to the squared first-axis voltage command because the limit value L2 of the second-axis voltage command is a fixed value.

In contrast, in Embodiment 2, when the unlimited second-axis voltage command is larger than L1, the limit value L1 of the second-axis voltage command decreases in proportion to the squared first-axis voltage command, so that the limited second-axis voltage command also decreases in proportion to the squared first-axis voltage command; in addition, even when the unlimited second-axis voltage command is smaller than −L1, the amplitude of the limited second-axis voltage command decreases in proportion to the squared first-axis voltage command.

Because the voltage command calculation means 1a according to Embodiment 2 allows only a positive value, as the limit value L1 of the second-axis voltage command that decreases in proportion to the squared first-axis voltage command, the voltage phase cannot be controlled in a range exceeding the range from 0° to 180° when due to the voltage saturation of the electric-power converter 17, the voltage amplitude is constant (100%); however, regardless of the sign of the second-axis voltage command, the amplitude of the limited second-axis voltage command can decrease in proportion to the squared first-axis voltage command when due to the voltage saturation of the electric-power converter 17, the voltage amplitude is constant (100%). As a result, in the case where the electric-power converter 17 is voltage-saturated, the amplitude of the voltage outputted by the electric-power converter 17 is constant and the voltage phase with respect to the first axis can linearly be changed in accordance with the change in the first-axis voltage command; therefore, there is obtained an effect that stable control can be performed even when the voltage phase with respect to the first axis is 180°, i.e., even when the voltage phase approaches the first axis. Accordingly, regardless of the sign of the rotation speed of the AC rotating machine 3, the amplitude of the second-axis voltage command decreases in proportion to the squared first-axis voltage command when the rotation speed of the AC rotating machine is high and hence the electric-power converter 17 is voltage-saturated; thus, there is obtained an effect that the rotation speed of the AC rotating machine vs. output torque characteristic does not depend on the sign of the rotation speed.

Embodiment 3

The voltage command calculation means 1a described in Embodiment 2 makes it possible that regardless of the sign of the second-axis voltage command, the amplitude of the limited second-axis voltage command can decrease in proportion to the squared first-axis voltage command when due to the voltage saturation of the electric-power converter 17, the voltage amplitude is constant (100%); however, the voltage phase with respect to the first axis cannot be controlled in a range exceeding the range from 0° to 180°. Thus, in Embodiment 3, there will be explained a control device for an AC rotating machine that can control the voltage phase with respect to the first axis in a range exceeding the range from 0° to 180° when the electric-power converter 17 is voltage-saturated, while keeping the rotation speed of the AC rotating machine vs. output torque characteristic from depending on the sign of the rotation speed of the AC rotating machine.

Figure 6:
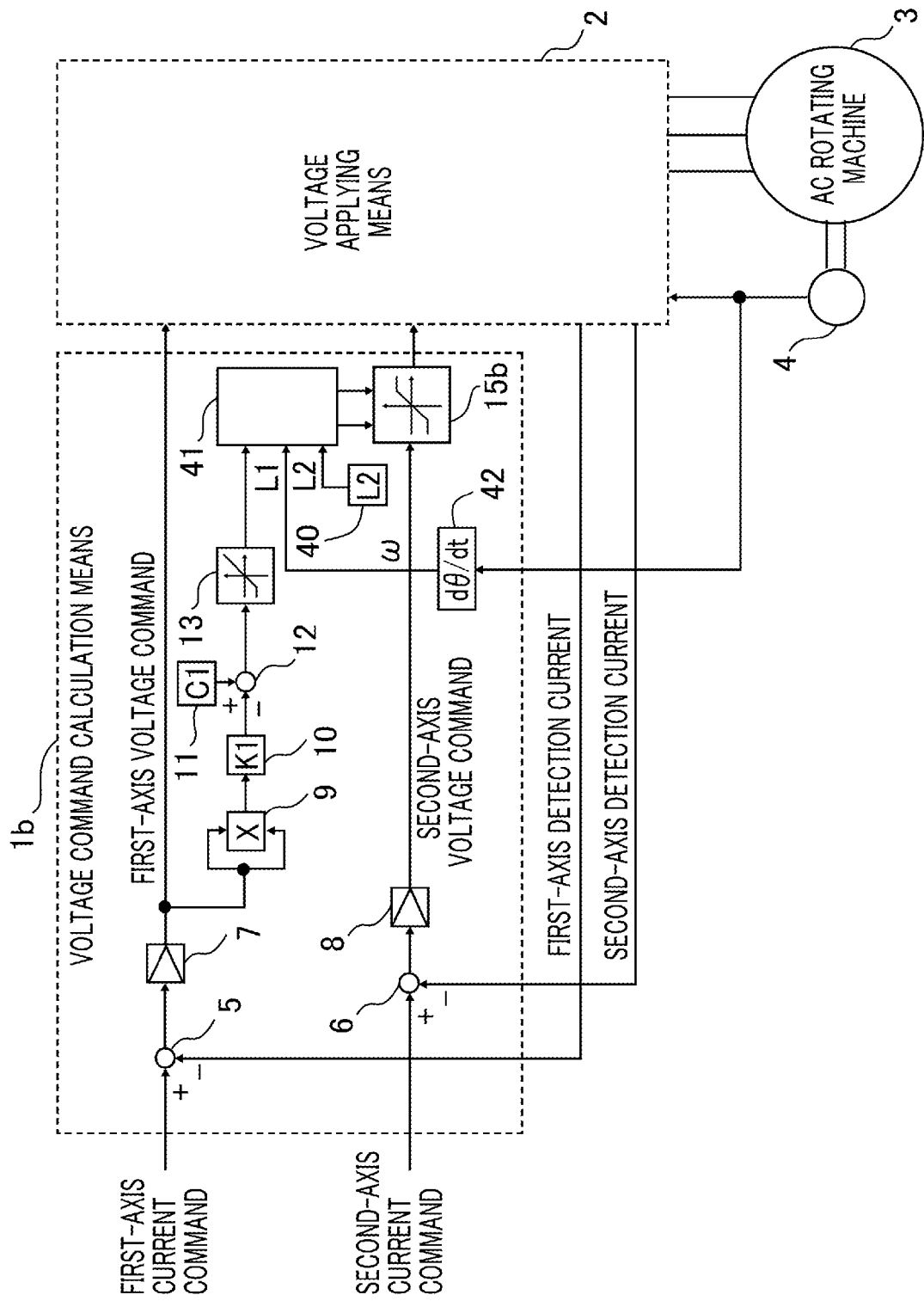
FIG. 6 is a diagram illustrating the configuration of a control device for an AC rotating machine according to Embodiment 3 of the present invention.

FIG. 6 is a diagram illustrating the configuration of a control device for an AC rotating machine according to Embodiment 3 of the present invention; the same reference characters as those in the foregoing embodiments denote the same or similar constituent elements. A voltage command calculation means 1b that calculates voltage commands on the rotation two axes outputs first-axis and second-axis voltage commands, based on first-axis and second-axis current commands, first-axis and second-axis detection currents, and the rotation position of the AC rotating machine 3 obtained from the rotation-position detection device 4. A constant setting device 40 inside the voltage command calculation means 1b outputs an arbitrary positive number L2, which has been preliminarily set.

An upper/lower limit value calculation device 41 outputs an upper limit value and a lower limit value to a limiting device 15b, based on L1 obtained from the lower limit value limiting device 13, L2 obtained from the constant setting device 40, and the rotation speed obtained from the rotation speed calculation device 42. The rotation speed calculation device 42 outputs a rotation speed calculated based on a rotation-position changing rate obtained from the rotation-position detection device 4.

The limiting device 15b limits the second-axis voltage command in such a way that the second-axis voltage command falls within a range from the upper limit value to the lower limit value; when the second-axis voltage command obtained from the difference amplifier 8 is larger than the upper limit value obtained from the upper/lower limit value calculation device 41, the limiting device 15b outputs the upper limit value, and when the second-axis voltage command obtained from the difference amplifier 8 is smaller than the lower limit value obtained from the upper/lower limit value calculation device 41, the limiting device 15b outputs the lower limit value; in other cases, the limiting device 15b outputs the second-axis voltage command obtained from the difference amplifier 8.

FIG. 7 is a table in which upper and lower limit values outputted by the upper/lower limit value calculation device 41 are described. As can be seen from FIG. 7, in the case where the rotation speed is positive, the upper and lower limit values outputted by the upper/lower limit value calculation device 41 are L1 and −L2, respectively. In this case, the relationship between the first-axis voltage command and the limit value of the second-axis voltage command, controlled by the limiting device 15b, is as represented in FIG. 8.

Figure 8:
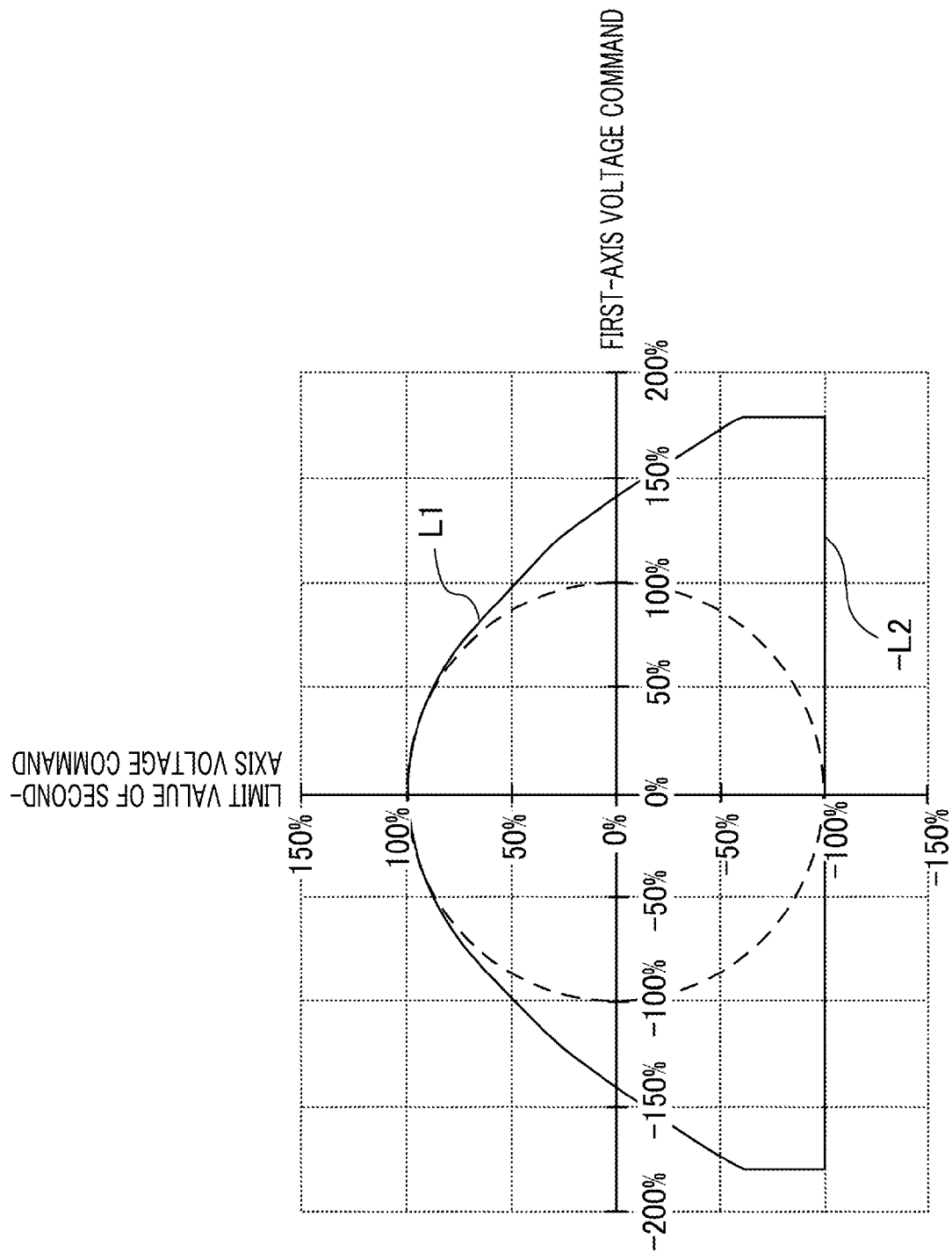
FIG. 8 is a chart representing, at a time when the rotation speed is positive, the relationship between the first-axis voltage command and the limit value of the second-axis voltage command according to Embodiment 3 of the present invention.

As can be seen from FIG. 8, in the case where the rotation speed is positive, the limiting device 15b operates in the same manner as the limiting device in Embodiment 1. Also in Embodiment 3, as is the case with Embodiment 1, the first axis on the rotation two axes is set to a direction having the same phase as the rotor magnetic flux of the AC rotating machine 3, and the second axis on the rotation two axes is set to a direction that is perpendicular to the first axis on the rotation two axes. With this configuration, in the case where the sign of the rotation speed is positive and the rotation speed is high, the second-axis voltage command outputted by the difference amplifier 8 increases in the positive direction.

When the electric-power converter 17 is voltage-saturated, the limiting device 15b makes the upper limit value of the second-axis voltage command decrease in proportion to the squared first-axis voltage command; thus, the amplitude of the voltage outputted by the electric-power converter 17 is constant and the voltage phase with respect to the first axis can linearly be changed in accordance with the change in the first-axis voltage command. As a result, stable control can be performed even when the voltage phase with respect to the first axis is 180°, i.e., even when the voltage phase approaches the first axis. Furthermore, the lower limit value limiting device 13 sets L1min to a negative value and outputs L1 while limiting L1 to L1min or larger; therefore, because when the electric-power converter 17 is voltage-saturated, the second-axis voltage command that is limited by the limiting device 15b can be set to a negative value, the voltage phase with respect to the first axis can be controlled within a wide range exceeding the range of 0° to 180° even when due to voltage saturation of the electric-power converter 17, the voltage amplitude is constant (100%).

Figure 9:
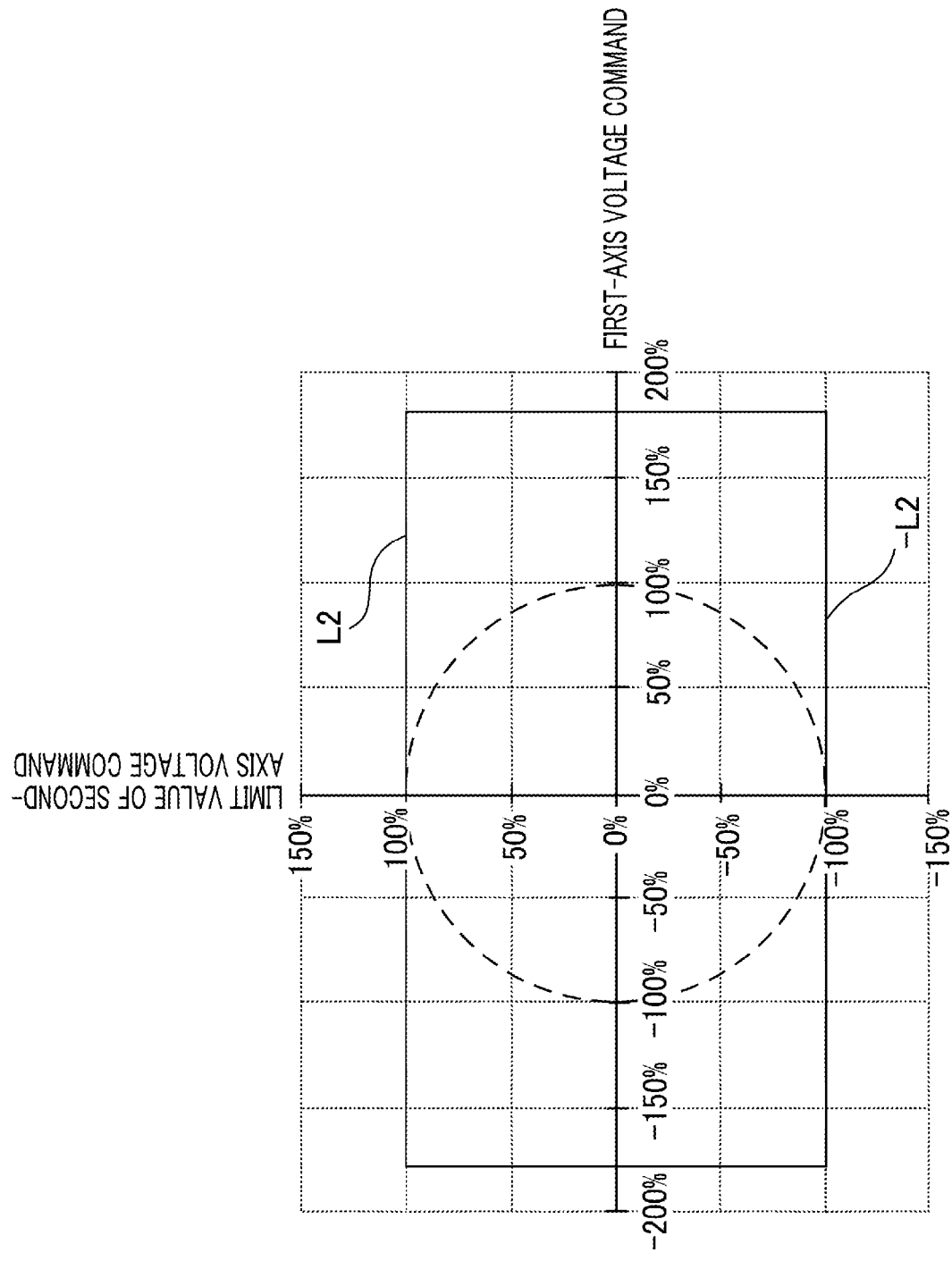
FIG. 9 is a chart representing, at a time when the rotation speed is zero, the relationship between the first-axis voltage command and the limit value of the second-axis voltage command according to Embodiment 3 of the present invention.

As described in FIG. 7, in the case where the rotation speed is zero, the upper and lower limit values outputted by the upper/lower limit value calculation device 41 are L2 and −L2, respectively. In this case, the relationship between the first-axis voltage command and the limit value of the second-axis voltage command, controlled by the limiting device 15b, is as represented in FIG. 9. The voltage saturation of the electric-power converter 17 occurs when the rotation speed of the AC rotating machine is high, but does not occur when the rotation speed is zero; thus, it is not required to make the limit value of the second-axis voltage command decrease in proportion to the squared first-axis voltage command.

Figure 10:
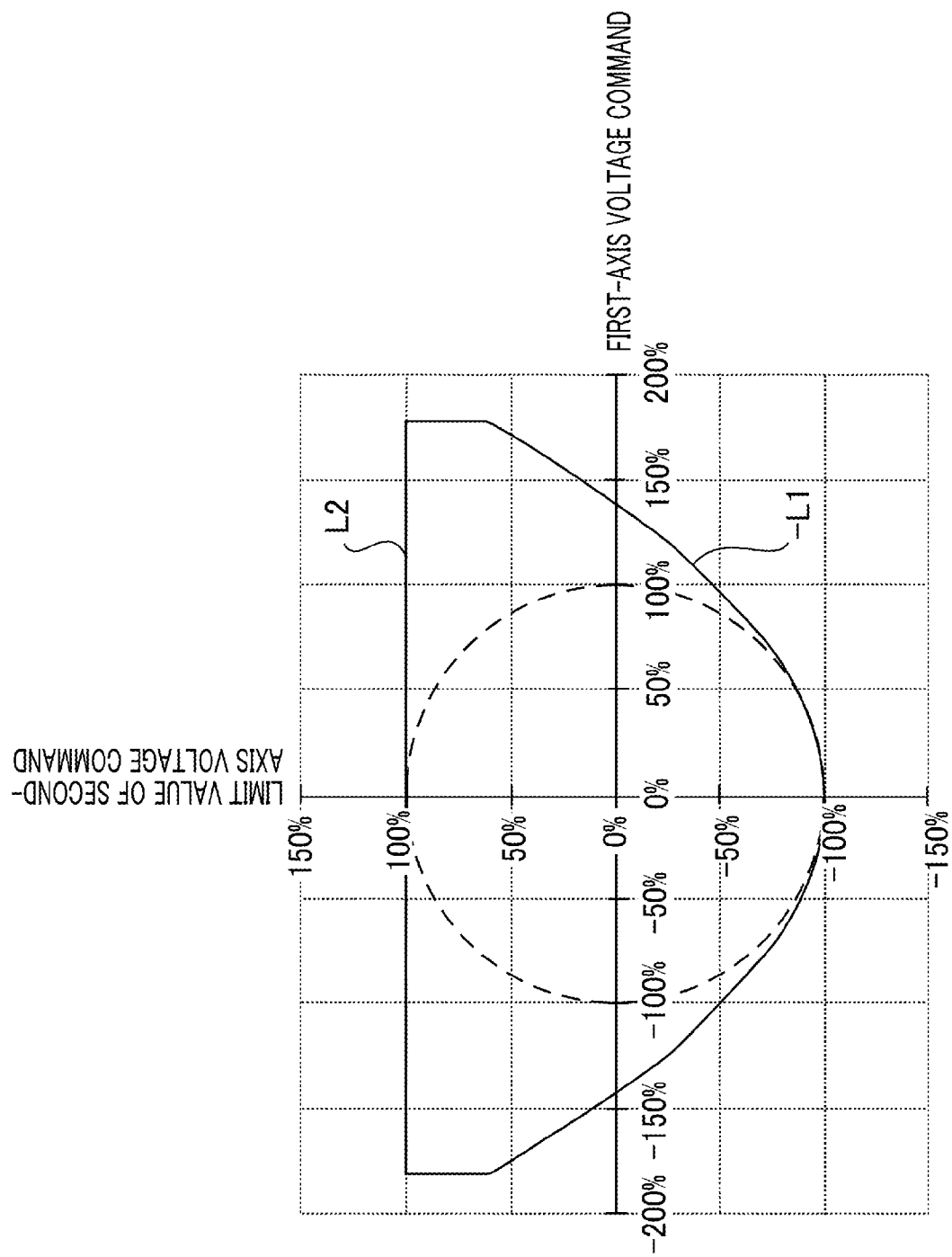
FIG. 10 is a chart representing, at a time when the rotation speed is negative, the relationship between the first-axis voltage command and the limit value of the second-axis voltage command according to Embodiment 3 of the present invention.

As can be seen from FIG. 7, in the case where the rotation speed is negative, the upper and lower limit values outputted by the upper/lower limit value calculation device 41 are L2 and −L1, respectively. In this case, the relationship between the first-axis voltage command and the limit value of the second-axis voltage command, controlled by the limiting device 15b, is as represented in FIG. 10. In the case where the sign of the rotation speed is negative and the rotation speed is high, the second-axis voltage command outputted by the difference amplifier 8 has a negative sign and the amplitude thereof increases. When the electric-power converter 17 is voltage-saturated, the limiting device 15b makes the lower limit value of the second-axis voltage command decrease in proportion to the squared first-axis voltage command; thus, the amplitude of the voltage outputted by the electric-power converter 17 is constant and the voltage phase with respect to the first axis can linearly be changed in accordance with the change in the first-axis voltage command. As a result, stable control can be performed even when the voltage phase with respect to the first axis is −180°, i.e., even when the voltage phase approaches the first axis. Furthermore, the lower limit value limiting device 13 sets L1min to a negative value and outputs L1 while limiting L1 to L1min or larger, and when the rotation speed is negative, the lower limit value outputted by the upper/lower limit value calculation device 41 is −L1; therefore, because when the electric-power converter 17 is voltage-saturated, the second-axis voltage command that is limited by the limiting device 15b can also be set to a positive value, the voltage phase with respect to the first axis can be controlled within a wide range exceeding the range of 0° to −180° even when due to voltage saturation of the electric-power converter 17, the voltage amplitude is constant (100%).

As described above, in accordance with the rotation direction, the voltage command calculation means 1b in the control device for an AC rotating machine according to Embodiment 3 sets the limit value of the second-axis voltage command that decreases in proportion to the squared first-axis voltage command to the upper limit value of the second-axis voltage command or the lower limit value of the second-axis voltage command; therefore, the voltage phase with respect to the first axis can be controlled even in a range exceeding the range from 0° to 180° or the range from 0° to −180° while the rotation speed of the AC rotating machine vs. output torque characteristic is kept from depending on the sign of the rotation speed of the AC rotating machine.

In the control device for an AC rotating machine according to Embodiment 3, the limit value of the second-axis voltage command decreases in proportion to the squared first-axis voltage command; therefore, in the case where the electric-power converter 17 is voltage-saturated, the amplitude of the voltage outputted by the electric-power converter 17 is constant and the voltage phase with respect to the first axis can linearly be changed in accordance with the change in the first-axis voltage command. As a result, there is obtained an effect that stable control can be performed even when the voltage phase with respect to the first axis is 180°, i.e., even when the voltage phase approaches the first axis.

Because the first axis on the rotation two axes is set to a direction having the same phase as the rotor magnetic flux of the AC rotating machine 3, the second-axis voltage command outputted by the difference amplifier 8 is limited by the limiting device 15 in accordance with the amplitude of the first-axis voltage command; however, because the first-axis voltage command outputted by the difference amplifier 7 is not limited, the first-axis voltage command acts in such away that the current difference in the direction having the same phase as the rotor magnetic flux becomes zero. In some cases, the limiting device 15 cannot control the current in the direction perpendicular to the rotor magnetic flux to be a desired value; however, because the output of the difference amplifier 7 is not limited, the current in the direction having the same phase as the rotor magnetic flux can be controlled to a desired value. Accordingly, when the first axis on the rotation two axes is set to a direction having the same phase as the rotor magnetic flux, the current can be controlled to a desired value in a direction that cancels the rotor magnetic flux; thus, the induction voltage can be reduced. As a result, there is obtained an effect that regardless of the sign of the rotation speed, the AC rotating machine 3 can be operated in such away that the rotation speed thereof falls into a higher range.

As described above, the voltage saturation of the electric-power converter 17 occurs when the rotation speed of the AC rotating machine 3 is high. In other words, because the voltage saturation does not occur when the rotation speed is the same as or lower than a predetermined value A1, it is not required to make the limit value of the second-axis voltage command decrease in proportion to the squared first-axis voltage command. Because of the foregoing fact, it goes without saying that as the upper and lower limit values outputted by the upper/lower limit value calculation device 41, the table described in FIG. 11 may be utilized instead of the table described in FIG. 7.

Embodiment 4

In each of Embodiments 1 through 3, a control device for an AC rotating machine has been explained; it may be allowed that the control device for an AC rotating machine generates torque for supplementing the steering torque so that a control device for an electric power steering apparatus is configured. In an electric power steering apparatus equipped with the control device for an AC rotating machine, the upper limit of the handwheel rotation speed depends on the upper limit of the rotation speed of the AC rotating machine. As the upper limit of the handwheel rotation speed increases, there can be provided an electric power steering apparatus with the increased emergency avoidance steering performance and the increased followability.

Figure 12:
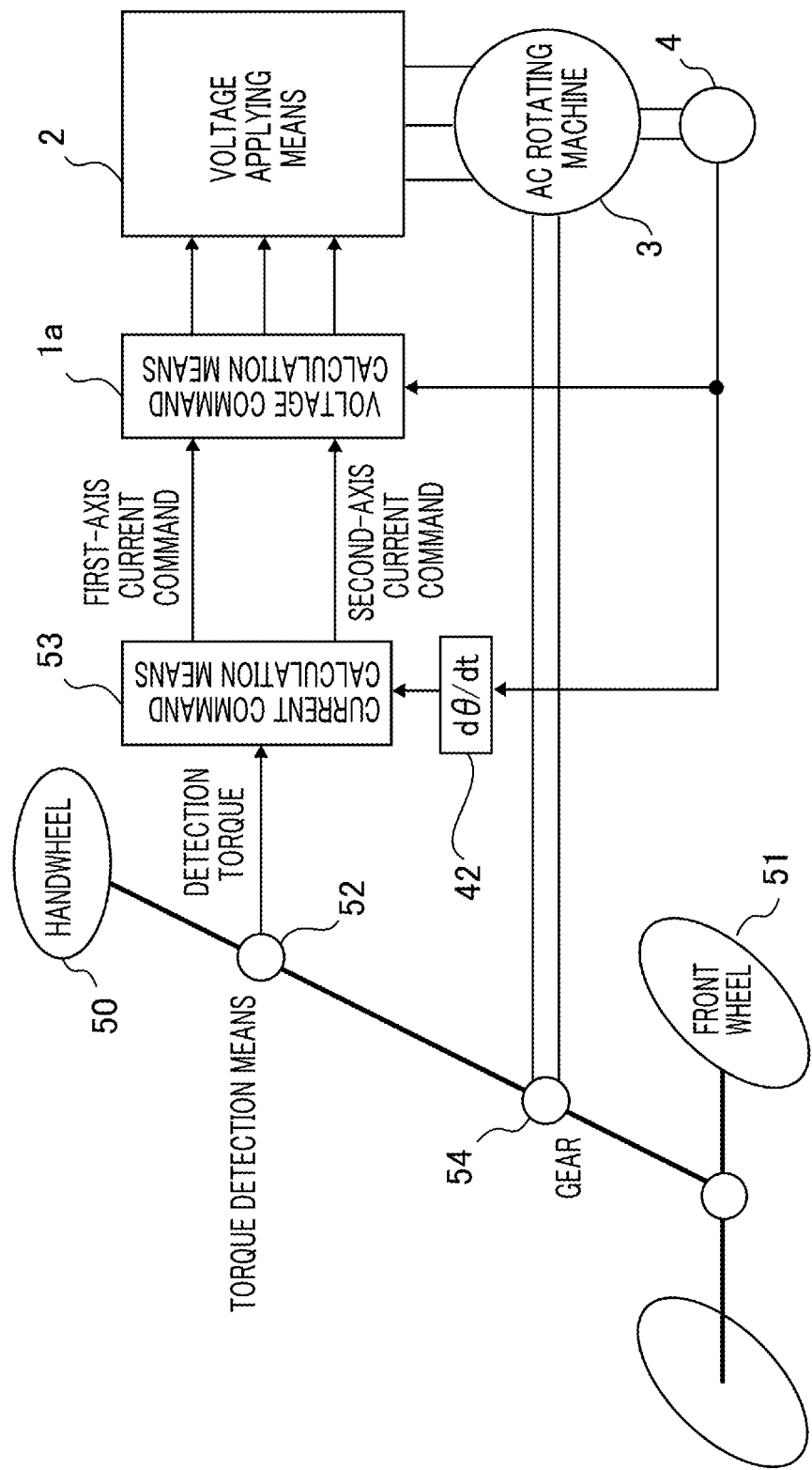
FIG. 12 is a diagram representing the overall configuration of a control device for an electric power steering apparatus according to Embodiment 4 of the present invention.

FIG. 12 is a diagram representing the configuration of a control device for an electric power steering apparatus according to Embodiment 4; the same reference characters as those in the foregoing embodiments denote the same or similar constituent elements. A driver rotates a handwheel 50 leftward or rightward so as to perform steering with a front wheel 51. A torque detection means 52 detects the steering torque of a steering system and outputs the detected torque to a current command calculation means 53. Based on the detected torque and the rotation speed obtained from the rotation speed calculation device 42, the current command calculation means 53 calculates and outputs the first-axis and second-axis current commands so that the AC rotating machine 3 generates torque for supplementing the steering torque of the steering system.

Also in Embodiment 4, the first axis on the rotation two axes is set to a direction having the same phase as the rotor magnetic flux of the AC rotating machine 3, and the second axis on the rotation two axes is set to a direction that is perpendicular to the first axis on the rotation two axes. When the rotation speed obtained from the rotation speed calculation device 42 becomes high, the current command calculation means 53 outputs the first-axis current command in a direction that cancels the rotor magnetic flux so that the AC rotating machine 3 can be operated in such a way that the rotation speed thereof falls into a higher range. As a result, there is obtained an effect that an electric power steering apparatus with a high emergency avoidance steering performance and a high followability can be obtained.

INDUSTRIAL APPLICABILITY

The present invention relates to a control device for an AC rotating machine that is suitably utilized in an electric power steering apparatus mounted in a vehicle.

DESCRIPTION OF REFERENCE NUMERALS

1: voltage command calculation means
2: voltage applying means
3: AC rotating machine
4: rotation-position detection device
5: subtractor
6: subtractor
7: difference amplifier
8: difference amplifier
9: multiplier
10: proportional calculation device
11: constant setting device
12: subtractor
13: lower limit value limiting device
14: constant setting device
15: limiting device
16: coordinate converter
17: electric-power converter
18: DC power source
19: current detection device
20: current detection device
21: current detection device

The invention claimed is:

1. A control device for an AC rotating machine comprising:
   a voltage command calculation means that calculates voltage commands on rotation two axes; and
   a voltage applying means that applies a voltage to an AC rotating machine, based on voltage commands on the rotation two axes outputted by the voltage command calculation means, wherein the voltage command calculation means calculates first-axis and second-axis voltage commands on the rotation two axes and reduces the limit value of the second-axis voltage command in proportion to the squared first-axis voltage command.

2. The control device for an AC rotating machine according to claim 1, wherein the voltage command calculation means sets the limit value of the second-axis voltage command that decreases in proportion to the squared first-axis voltage command to the upper limit value of the second-axis voltage command or the lower limit value of the second-axis voltage command.

3. The control device for an AC rotating machine according to claim 2, wherein the voltage command calculation means allows not only a positive value but also a negative value, as the limit value of the second-axis voltage command that decreases in proportion to the squared first-axis voltage command.

4. The control device for an AC rotating machine according to claim 3, wherein the first axis on the rotation two axes is set to a direction having the same phase as the rotor magnetic flux of the AC rotating machine, and the second axis on the rotation two axes is set to a direction that is perpendicular to the first axis on the rotation two axes.

5. The control device for an AC rotating machine according to claim 2, wherein the first axis on the rotation two axes is set to a direction having the same phase as the rotor magnetic flux of the AC rotating machine, and the second axis on the rotation two axes is set to a direction that is perpendicular to the first axis on the rotation two axes.

6. The control device for an AC rotating machine according to claim 1, wherein the voltage command calculation means allows not only a positive value but also a negative value, as the limit value of the second-axis voltage command that decreases in proportion to the squared first-axis voltage command.

7. The control device for an AC rotating machine according to claim 6, wherein the first axis on the rotation two axes is set to a direction having the same phase as the rotor magnetic flux of the AC rotating machine, and the second axis on the rotation two axes is set to a direction that is perpendicular to the first axis on the rotation two axes.

8. The control device for an AC rotating machine according to claim 1, wherein the first axis on the rotation two axes is set to a direction having the same phase as the rotor magnetic flux of the AC rotating machine, and the second axis on the rotation two axes is set to a direction that is perpendicular to the first axis on the rotation two axes.

9. An electric power steering apparatus including the control device for an AC rotating machine according to claim 1.

\* \* \* \* \*